United States Patent [19]

Hatano et al.

[11] Patent Number: 5,144,463
[45] Date of Patent: Sep. 1, 1992

[54] LIQUID CRYSTAL LIGHT VALVE USING NON-MONOCHROMATIC WRITING LIGHT

[75] Inventors: Hideki Hatano; Akira Yokoi; Masayuki Iwasaki; Takashi Yamaji, all of Iruma, Japan

[73] Assignee: Pioneer Electronic Corporation, Tokyo, Japan

[21] Appl. No.: 627,580

[22] Filed: Dec. 14, 1990

[30] Foreign Application Priority Data

Mar. 8, 1990 [JP] Japan ................... 2-57737

[51] Int. Cl.⁵ .................. G02F 1/135; G02F 1/13
[52] U.S. Cl. ........................ 359/72; 359/45
[58] Field of Search ............ 350/342, 351; 359/72, 359/45

[56] References Cited

U.S. PATENT DOCUMENTS 4,114,991  9/1978  Bleha, Jr. et al. ............ 350/342
4,343,535  8/1982  Bleha, Jr. ..................... 350/342
5,032,002  7/1991  Fonneland et al. ........... 350/162.12

FOREIGN PATENT DOCUMENTS 0111846  9/1979  Japan .................... 350/342
0019031  2/1981  Japan .................... 350/342

Primary Examiner—Stanley D. Miller
Assistant Examiner—Anita Pellman Gross
Attorney, Agent, or Firm—Foley & Lardner

[57] ABSTRACT

A liquid crystal display unit uses a photoconductive type liquid crystal light valve. By using non-monochromatic light as the writing light, the light excitation can be induced near the surface layer of the photoconductive layer by light of a shorter wavelength and also on portions deep in the layer by light of a longer wavelength. Thus, it is possible to induce the light excitation effectively on the photoconductive layer even when it is thick.

3 Claims, 3 Drawing Sheets

LIQUID CRYSTAL LIGHT VALVE USING NON-MONOCHROMATIC WRITING LIGHT

BACKGROUND OF THE INVENTION

1. Field of the Invention

The present invention relates to a liquid crystal display unit, and more particularly to a liquid crystal display unit using a photoconductive liquid crystal light valve.

2. Description of Background Information

FIG. 1 shows the principle of a projection type liquid crystal display unit, for example, using a photoconductive liquid crystal light valve. In this Figure, an image is written on the photoconductive liquid crystal light valve by the writing light emitted from the writing optical system 2. On the other hand, the light emitted from a light source 3 enters the polarization beam splitter 4. Of the incident light, S polarized light component is deflected at a right angle by a polarization beam splitter 4, and it enters the photoconductive liquid crystal light valve 1 as the reading light.

If an image is given on the liquid crystal layer of the photoconductive liquid crystal light value 1, the light reflected at the photoconductive liquid crystal light valve 1 contains P polarized component locally according to the density of the image on the liquid crystal layer. When only P polarized component of this reflected light passes through the polarization beam splitter 4, the image is projected on a screen 6 through a projection lens system 5 by this P polarized component.

FIG. 2 shows the structure of the photoconductive liquid crystal light valve 1 used on this projection type liquid crystal display unit. In this Figure, a spacer 12 is placed around the liquid crystal layer 11, and liquid crystal orientation layers 13 and 14 are provided on both sides of the liquid crystal layer 11. The photoconductive layer 15 consists, for example, of amorphous silicon (hereinafter abbreviated as "a-Si"), and it is laminated on the liquid crystal orientation layer 13 through a light reflection layer 16 and a light cutoff layer 17. On the outer lateral side of the liquid crystal orientation layer 14, a transparent electrode 18 made of indium tin oxide (ITO) is disposed, while a transparent electrode 19 made of tin dioxide ($SnO_2$) is arranged on the outer lateral side of the photoconductive layer 15. These elements are sealed by a pair of glass substrates 20 and 21.

In a photoconductive type liquid crystal light valve 1 of such a structure, an AC voltage is applied between the transparent electrodes 18 and 19. If the internal impedance of the photoconductive layer 15 is in a dark condition, that is, when no writing light is irradiated from the left side (write side) of the Figure, is set to a value sufficiently higher than that of the liquid crystal layer 11, the AC voltage is applied mainly on the photoconductive layer 15. When the writing light is irradiated and an image is given on the photoconductive layer 15 by this writing light, the internal impedance of the photoconductive layer 15 is locally decreased according to the density of the image. Thus, on the liquid crystal layer 11 adjacent to this decreased portion, the AC voltage applied between the transparent electrodes 18 and 19 is modulated spatially according to the density of the image, so that the image is written on it.

The ratio between voltages applied on the liquid crystal layer 11 when the writing light is irradiated and when it is not irradiated is called a light switching ratio, and the light switching ratio is a parameter to indicate the operating status of the photoconductive type liquid crystal light valve.

In the writing optical system 2 (FIG. 1) of this photoconductive type liquid crystal light valve 1, a monochromatic light is used as the writing light. On the other hand, to increase the light switching ratio, the thickness of the photoconductive layer 15 consisting of a-Si and the like must be several $\mu$m. However, both light absorption and photoconductive sensitivities of such a thick photoconductive layer 15 show a wavelength dependency. Namely, as it is evident from FIG. 3, no absorption occurs for the longer wavelength of 700 nm or more, and sensitivity is rapidly decreased. On the other hand, absorption is limited to the surface layer for the shorter wavelength. Thus, photoconductive effect does not occur on the entire thick photoconductive layer 15, and this also leads to the decrease of sensitivity. Therefore, to give an optimal sensitivity, there must be restrictions to the thickness of the photoconductive layer 15 and to the wavelength of the light.

SUMMARY OF THE INVENTION

Therefore, it is an object of the present invention to provide a liquid crystal display unit, by which it is possible to have a high light switching ratio of photoconductive type liquid crystal light valve by effectively inducing the light excitation on a thick photoconductive layer.

The liquid crystal display unit of the present invention is a liquid crystal display unit, which comprises a photoconductive type liquid crystal light valve having a photoconductive layer and a liquid crystal layer laminated between a pair of opposing transparent electrodes through a light reflecting layer, and a writing optical system to irradiate a writing light to this liquid crystal light valve, wherein a non-monochromatic light is used as writing light.

In the liquid crystal display unit according to the present invention, the non-monochromatic light is used as the writing light, so that portions near the surface layer of the photoconductive layer are excited by light components of shorter wavelengths, and portions deep in the photoconductive layer are excited by light components of longer wavelengths.

DETAILED DESCRIPTION OF THE PREFERRED EMBODIMENTS

In the following, the embodiments of the invention will be described in detail in connection with the accompanying drawings.

Figure 1:
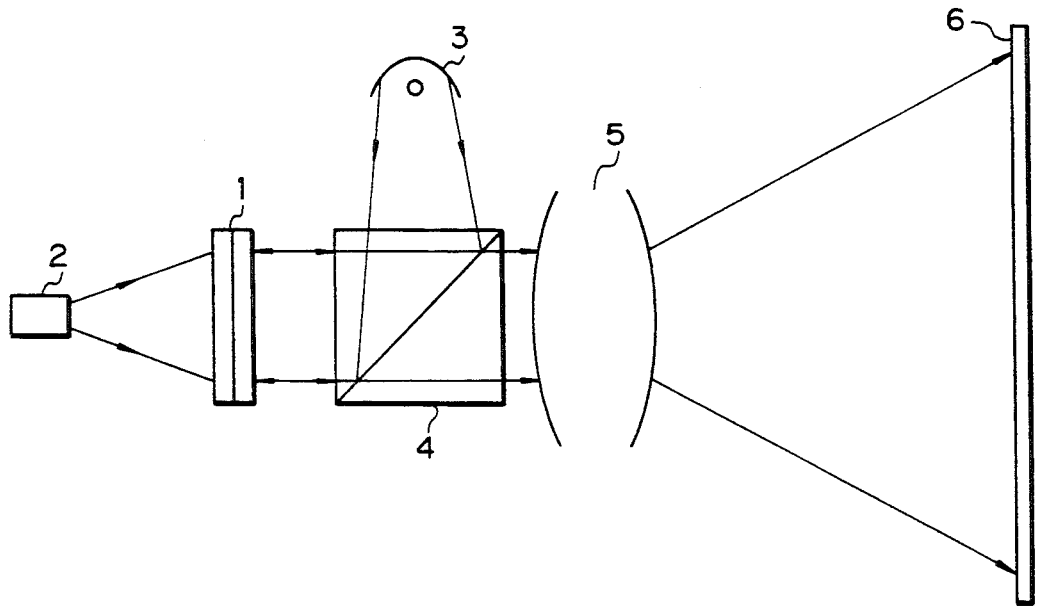
FIG. 1 is a diagram showing the principle of a projection type liquid crystal display unit.
Figure 2:
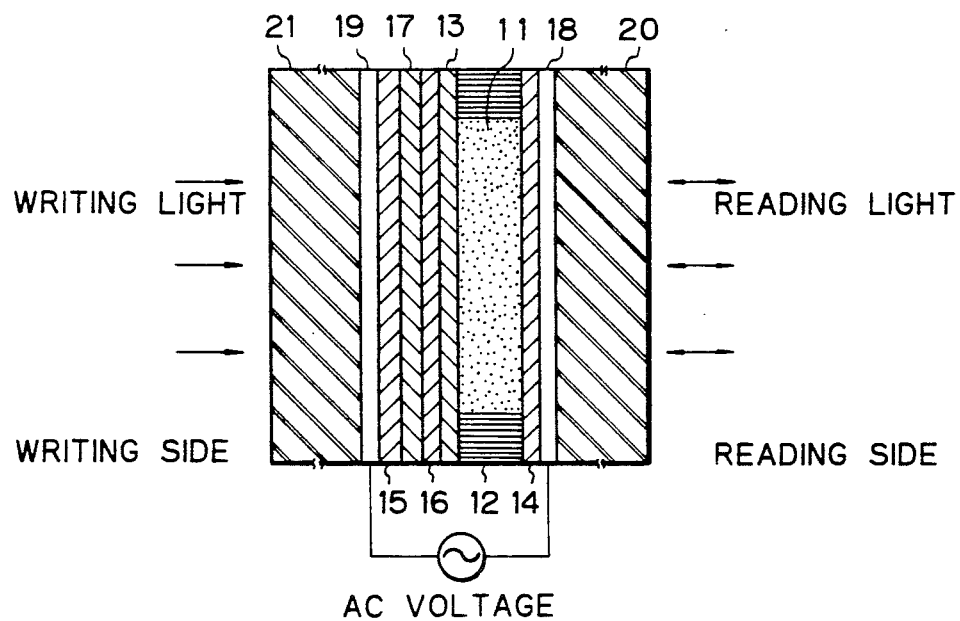
FIG. 2 is a sectional view showing the basic structure of a photoconductive type liquid crystal light valve.
Figure 3:
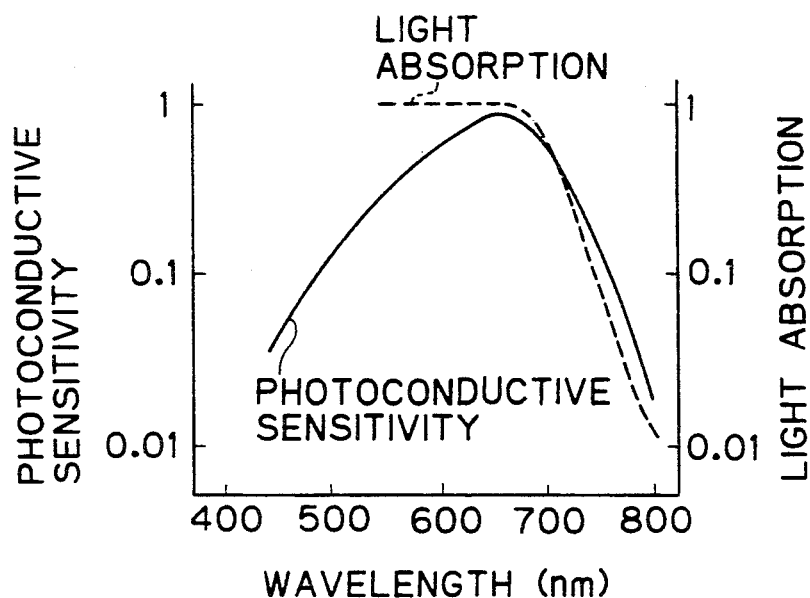
FIG. 3 is a characteristics diagram showing the dependency on optical wavelength of light absorption and photoconductive sensitivities of the photoconductive layer.
Figure 4:
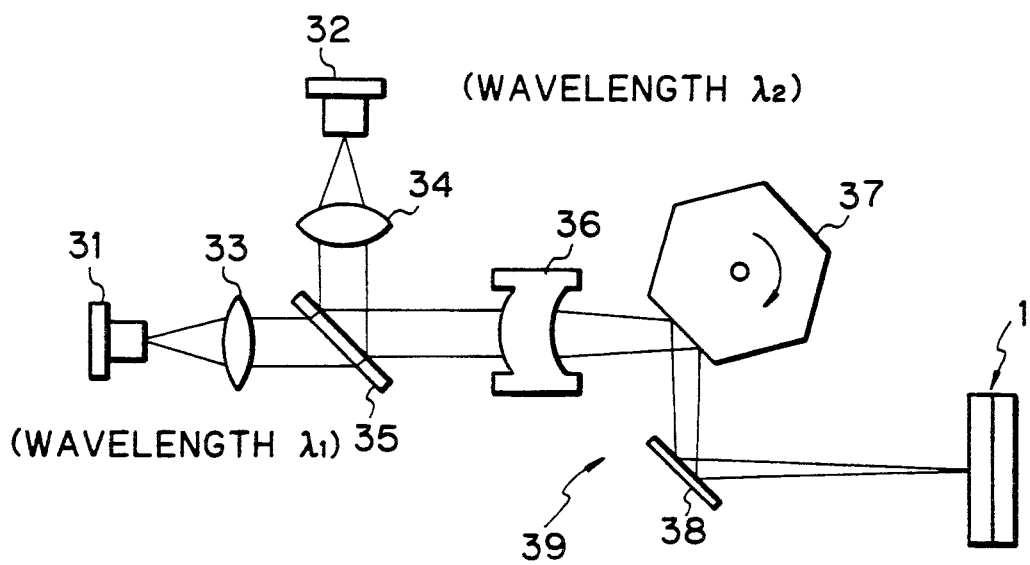
FIG. 4 represents the arrangement of a first embodiment of the writing optical system in the liquid crystal display unit according to the present invention.

FIG. 4 shows the arrangement of a first embodiment of the writing optical system in the liquid crystal display unit of this invention. In this embodiment, for example, two light sources 31 and 32 are provided, which issue lights with different wavelengths. As these light sources 31 and 32, a semi-conductor laser, a light emitting diode (LED), etc. may be used. The diffused light having wavelength of $\lambda_1$ and $\lambda_2$ emitted from each of the light sources 31 and 32 are turned to parallel beams after passing through collimator lenses 33 and 34. One of them is transmitted through a dichroic mirror 35, and the other is reflected by the dichroic mirror 35. Then, they are mixed together and are emitted as the writing light having two wavelengths of $\lambda_1$ and $\lambda_2$. This writing light passes through the lens system 36 and enters a two-dimensional scanning system 39 consisting of a polygon mirror for the vertical deflection 37 and a galvanomirror for the horizontal deflection 38. Being deflected two-dimensionally on this two-dimensional scanning system 39, the writing light scans the photoconductive type liquid crystal light valve 1 two-dimensionally.

The two-dimensional scanning system 39 consisting of the polygon mirror 37 for the vertical deflection and the galvanomirror 38 for the horizontal deflection is only an example, and the invention is not limited to the above arrangement.

By using non-monochromatic light, e.g. the writing light having two wavelengths, as the writing light, excitation can be induced near the surface layer of the photoconductive layer 15 on the photoconductive type liquid crystal light valve by the component of shorter wavelength, and also on the portion deep in the photoconductive layer 15 by the component of longer wavelength. This makes it possible to have higher light switching ratio of the liquid crystal light valve because light excitation can be effectively induced even on thick photoconductive layer 15.

Figure 5A:
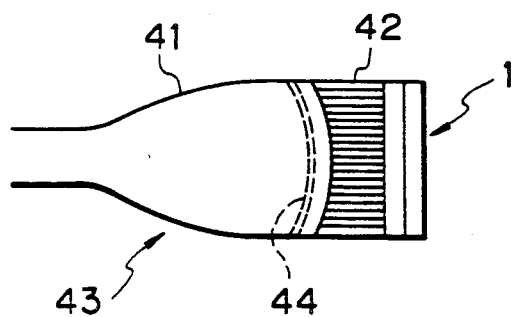
FIG. 5A shows the arrangement of a second embodiment of the writing optical system.
Figure 5B:
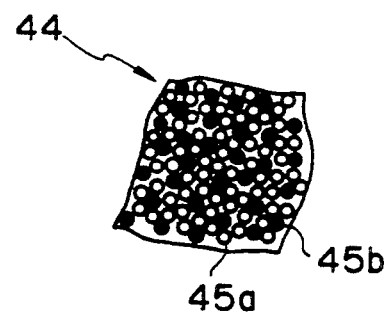
FIG. 5B is a sectional view of the CRT face plate in FIG. 5A.

FIG. 5A shows the arrangement of a second embodiment of the writing optical system. In this embodiment, an optical fiber tube 43 consisting of a CRT (cathode ray tube) 41 and an optical fiber 42 in combination, the optical fiber 42 guiding images displayed on CRT 41 to the photoconductive type liquid crystal light valve 1, is used as the writing optical system. In this optical fiber tube 43, a face plate 44 of the CRT 41 contains at least two types of fluorescent materials 45a and 45b, uniformly dispersed as given in FIG. 5B, so that the light of two wavelengths is apparently and simultaneously emitted by the fluorescent materials 45a and 45b.

Figure 6:
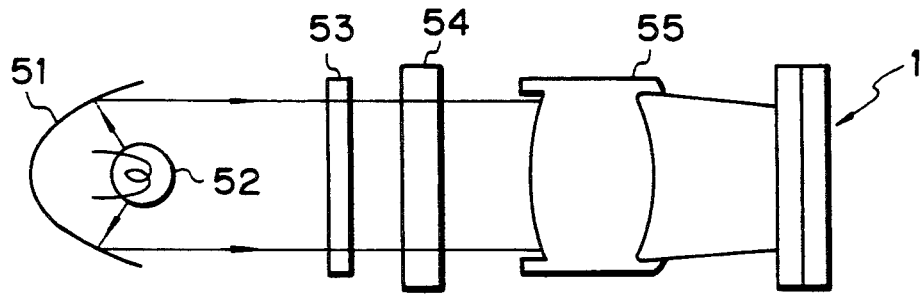
FIG. 6 is a diagram showing the arrangement of a third embodiment of the writing optical system.

FIG. 6 shows the arrangement of a third embodiment of the writing optical system. This embodiment uses a white light source 52 such as a halogen lamp, a tungsten lamp, etc. disposed at the focal point of a parabolic mirror 51. The white light emitted from this white light source 52 enters a two-dimensional light emitting element 54 such as a liquid crystal TV or a electroluminescence (EL) element after infrared rays are cut off by infrared cutting filter 53. The light passing through this two-dimensional luminescence element 54 is guided to the photoconductive type liquid crystal light valve 1 by the lens system 55.

Because non-monochromatic light is used as the writing light in both of the second and the third embodiments, the light excitation can be effectively induced on the thick photoconductive layer 15 as in the case of the first embodiment, and it is possible to have a higher light switching ratio of the liquid crystal light valve.

As described above, non-monochromatic light is used as the writing light to be irradiated on the photoconductive type liquid crystal light valve for writing an image, in the liquid crystal display unit of this invention. Because the excitation can be induced near the surface layer of the photoconductive layer by the components of shorter wavelengths, and also on the portions deep in the photoconductive layer by the components of longer wavelengths, it is possible to effectively induce the light excitation on the photoconductive layer even when it is thick. Thus, it is possible to have a higher light switching ratio of the photoconductive type liquid crystal light valve.

What is claimed is:
1. A liquid crystal display unit comprising:
   a photoconductive type liquid crystal light valve having a photoconductive layer, a light reflecting layer, and a liquid crystal layer laminated between a pair of opposing transparent electrodes; and
   a writing optical system for irradiating the writing light to said liquid crystal light valve, wherein said writing optical system uses a non-monochromatic light as a writing light;
   wherein said writing optical system comprises a light source emitting the writing light having at least two wavelengths and a two-dimensional scanning system for deflecting the writing light emitted from said light source two-dimensionally and for scanning said liquid crystal light valve two-dimensionally.
2. A liquid crystal display unit comprising:
   a photoconductive type liquid crystal light valve having a photoconductive layer, a light reflecting layer, and a liquid crystal layer laminated between a pair of opposing transparent electrodes; and
   a writing optical system for irradiating the writing light to said liquid crystal light valve, wherein said writing optical system uses a non-monochromatic light as a writing light;
   wherein said writing optical system comprises a CRT having a face plate containing at least two types of uniformly dispersed fluorescent materials and an optical fiber tube for guiding images displayed on said CRT to said liquid crystal light valve.
3. A liquid crystal display unit comprising:
   a photoconductive type liquid crystal light valve having a photoconductive layer, a light reflecting layer, and a liquid crystal layer laminated between a pair of opposing transparent electrodes; and
   a writing optical system for irradiating the writing light to said liquid crystal light valve, wherein said writing optical system uses a non-monochromatic light as a writing light;
   wherein said writing optical system comprises a white light source, a filter to cut off lights of predetermined wavelengths in the white light emitted from said white light source, a two-dimensional light emitting element, to which the light passing through said filter is irradiated, and an optical system for guiding the light passing through said two-dimensional light emitting element toward said liquid crystal light valve.

\* \* \* \* \*